(12) United States Patent
Alvarez

(10) Patent No.: US 11,192,062 B2
(45) Date of Patent: Dec. 7, 2021

(54) AIR-LIQUID AMINE CONTACTOR FOR GASEOUS CARBON DIOXIDE EXTRACTION FROM A PROCESS AIR STREAM

(71) Applicant: Giraldo Negrin Alvarez, Bacliff, TX (US)

(72) Inventor: Giraldo Negrin Alvarez, Bacliff, TX (US)

(*) Notice: Subject to any disclaimer, the term of this patent is extended or adjusted under 35 U.S.C. 154(b) by 357 days.

(21) Appl. No.: 16/507,874

(22) Filed: Jul. 10, 2019

(65) Prior Publication Data

US 2020/0289975 A1 Sep. 17, 2020

Related U.S. Application Data

(60) Provisional application No. 62/819,556, filed on Mar. 16, 2019.

(51) Int. Cl.
*B01D 53/14* (2006.01)
*B01D 53/18* (2006.01)
*B01D 53/62* (2006.01)
*B01D 53/78* (2006.01)

(52) U.S. Cl.
CPC ....... *B01D 53/185* (2013.01); *B01D 53/1475* (2013.01); *B01D 53/1493* (2013.01); *B01D 53/62* (2013.01); *B01D 53/78* (2013.01); *B01D 2252/204* (2013.01); *B01D 2257/504* (2013.01)

(58) Field of Classification Search
CPC ........ B01D 2252/204; B01D 2257/504; B01D 2258/06; B01D 53/1475; B01D 53/1493; B01D 53/18; B01D 53/185; B01D 53/62; B01D 53/78; Y02C 20/40
See application file for complete search history.

(56) References Cited

U.S. PATENT DOCUMENTS

| 3,576,317 A * | 4/1971 | Huntington ............ B01D 53/18 261/98 |
| 7,905,959 B2 | 3/2011 | Tzu et al. |
| 8,192,688 B2 | 6/2012 | Hagen et al. |
| 8,486,338 B2 | 7/2013 | Dickinson et al. |
| 10,010,829 B2 | 7/2018 | Wright et al. |
| 2018/0243682 A1 | 8/2018 | Isobe et al. |

OTHER PUBLICATIONS

Sieve distributor wedges co2 contactor corrugated contactor—Google Search (Year: 2021).*

* cited by examiner

*Primary Examiner* — Cabrena Holecek

(57) ABSTRACT

An air-liquid amine contactor for gaseous carbon dioxide extraction includes a manifold and a contactor. The manifold dispenses liquid amine into the contactor in a controlled manner. The liquid amine dispenses as a film that spreads over a plurality of plenum bodies mounted within the manifold. Each of the plurality of plenum bodies includes a plurality of V-shaped channels which increase the overall surface area of the plenum body. The plurality of V-shaped channels includes a first inner wall and a second inner wall positioned at an angle ranging from 24 to 28 degrees to each other. Further, each of the plurality of wedge-inserts includes a first fluid orifice, a second fluid orifice, and an inlet orifice. Each wedge-insert is positioned within a corresponding V-shaped channel. Finally, the contactor is mounted adjacent to the contactor which positions the plurality of V-shaped channels perpendicular to a bottom surface of the manifold.

12 Claims, 8 Drawing Sheets

US 11,192,062 B2

AIR-LIQUID AMINE CONTACTOR FOR GASEOUS CARBON DIOXIDE EXTRACTION FROM A PROCESS AIR STREAM

The current application claims a priority to the U.S. Provisional Patent application Ser. No. 62/819,556 filed on Mar. 16, 2019.

FIELD OF THE INVENTION

The present invention generally relates to an air-liquid contactor for gaseous carbon dioxide extractor from a process air. More specifically, the air-liquid contactor with a plurality of variably sized plenum bodies enables the contactor to be easily scaled.

BACKGROUND OF THE INVENTION

The air-liquid contactors are used to separate a gaseous compound from an incoming process air steam. The present invention has resulted from failed efforts to develop a self-contained system that could remove unacceptable levels of carbon dioxide from a given air volume. The air-liquid contactor is expected to combat the negative effects of Man-Made Global Warming, commonly known as "climate change"; by providing an affordable carbon removal system that can be concurrently embedded within current civil and industrial building air-handling systems. Preliminary testing indicates this use will have a significant impact that will promote the USA's ability to not only meet but exceed its near-term carbon reduction goals. Further, the present invention greatly increases the loading capacity before regeneration compared to alternate filter membranes of zeolite systems. The present invention also addresses the problem of pressure drop across the contactor by utilizing a scalable design that can have an increased or decreased footprint, depending on the application need.

The present invention is an air-liquid contactor within the carbon dioxide removal liquid amine process designed to maximize the contact between the carbon dioxide laden air and an absorbent agent such as liquid amine. The carbon dioxide is captured and sequestered in the liquid amine and separated in a downstream process using a thermal cycle. Due to the physical properties and the operation of the contactor, the present invention can be scaled to virtually any size, allowing various form-factors and sizes. The contactor is made of a plurality of plenum bodies that can vary in size and number for increased flexibility. The contactor itself is made out of a chemically resistive, caustic resistant, material with excellent humidity, moisture and chemical resistance. Alternately, the contactor can be made of stainless steel, polyamide, or any other material with appropriate qualities and parameters. A manifold connector on top of the contactor, evenly distributes the liquid amine into each of the plenum bodies. The plenum bodies themselves are fashioned with a plurality of V-shaped channels which maximize the contact area between the process air and the liquid amine. Finally, the bottom reservoir serves a liquid collection point and withdrawal area for the liquid amine.

DETAILED DESCRIPTION OF THE INVENTION

All illustrations of the drawings are for the purpose of describing selected versions of the present invention and are not intended to limit the scope of the present invention.

The present invention is an air-liquid amine contactor for gaseous carbon dioxide extraction from a process air stream. The air-liquid amine contactor intakes a process flow of ambient air and filters out carbon dioxide using a liquid amine chemical process that returns the process air back into the environment with greatly reduced carbon dioxide signature. The properties of liquid amine allow carbon dioxide loading in excess of 40% by volume. The present invention is also easily scalable and can have an increased or decreased footprint, thereby increasing the volume of the air being treated with the liquid amine.

Figure 1:
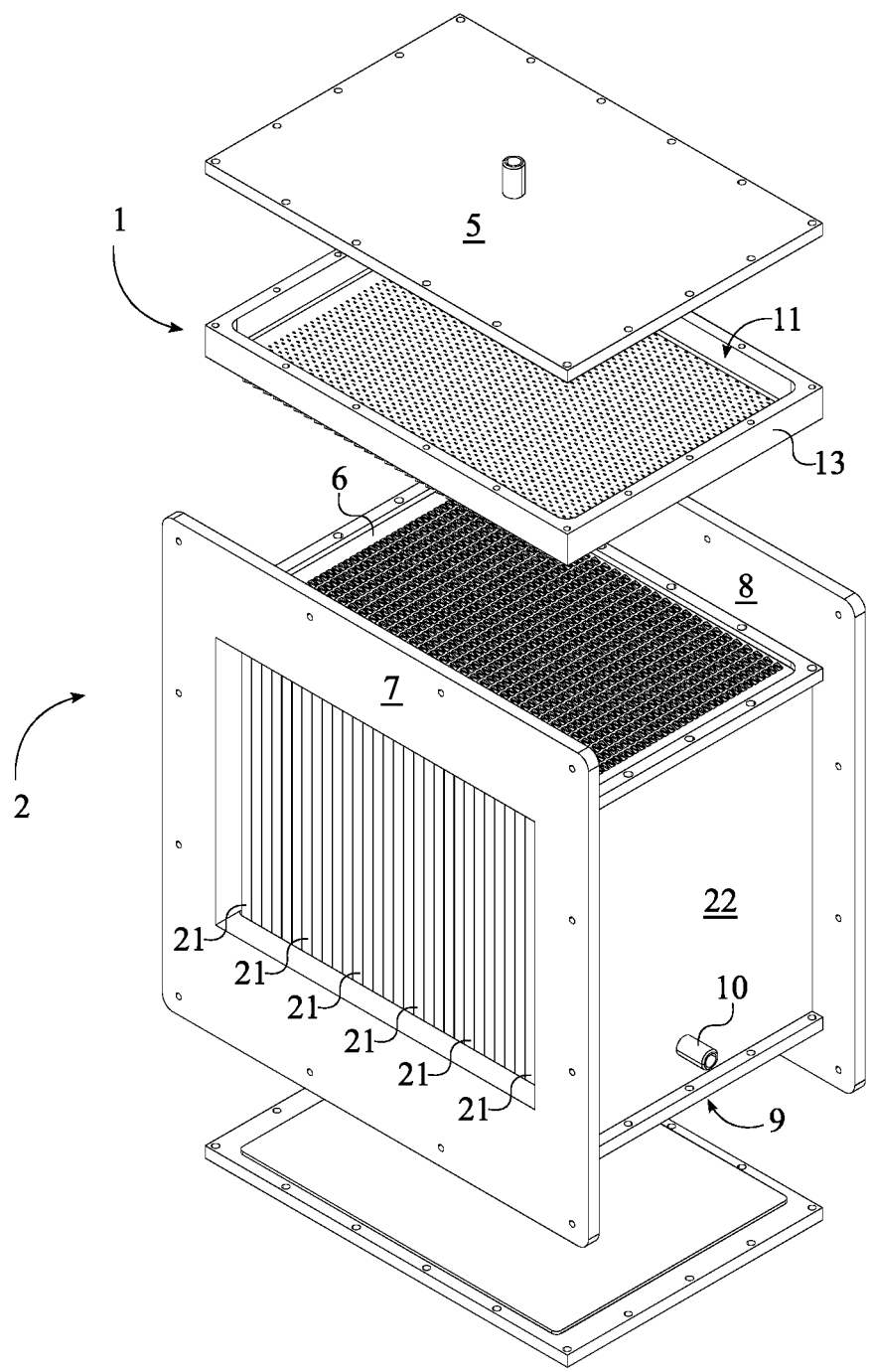
FIG. 1 is an exploded perspective view of the present invention.
Figure 2:
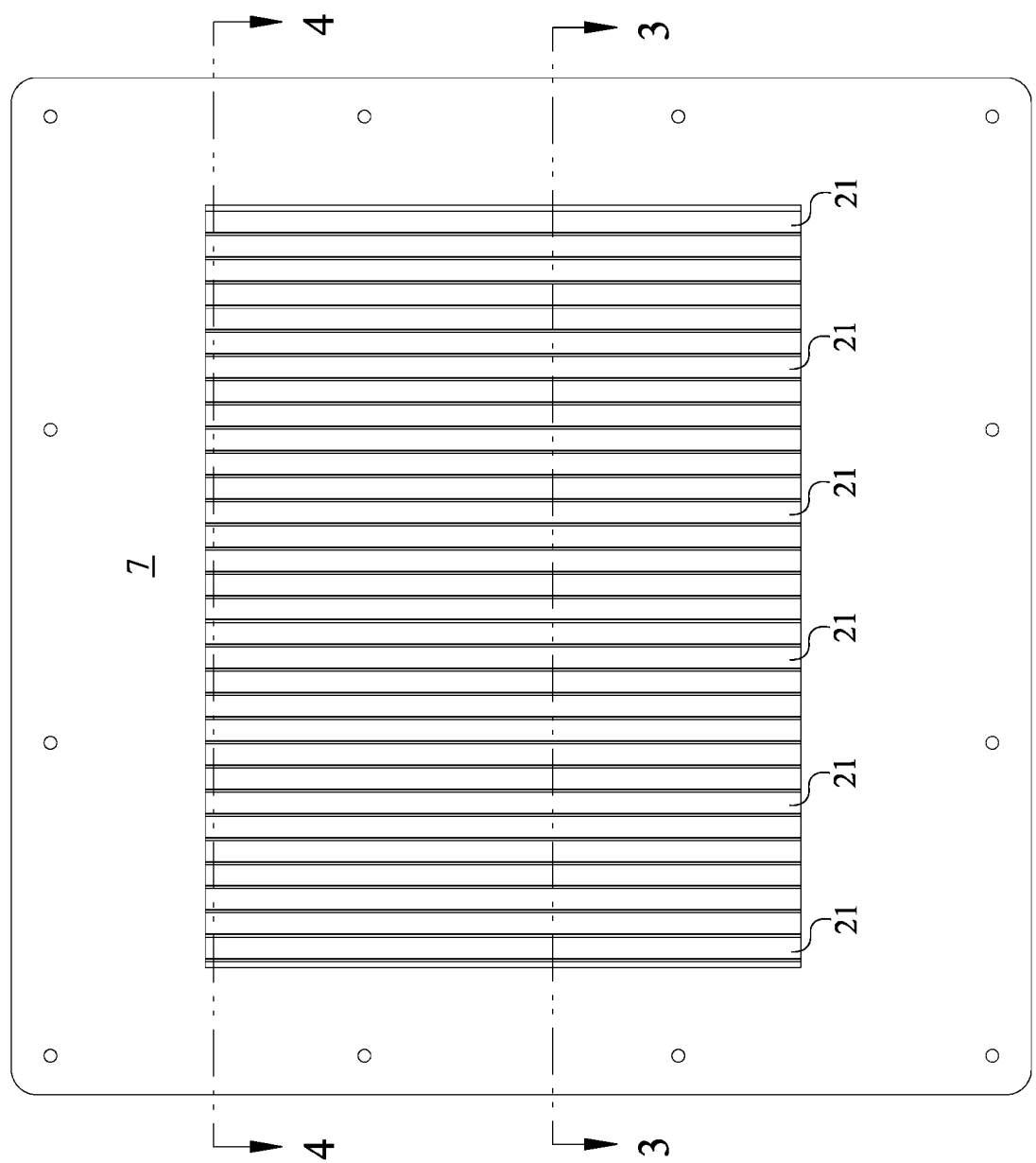
FIG. 2 is a side planform view of the present invention.
Figure 4:
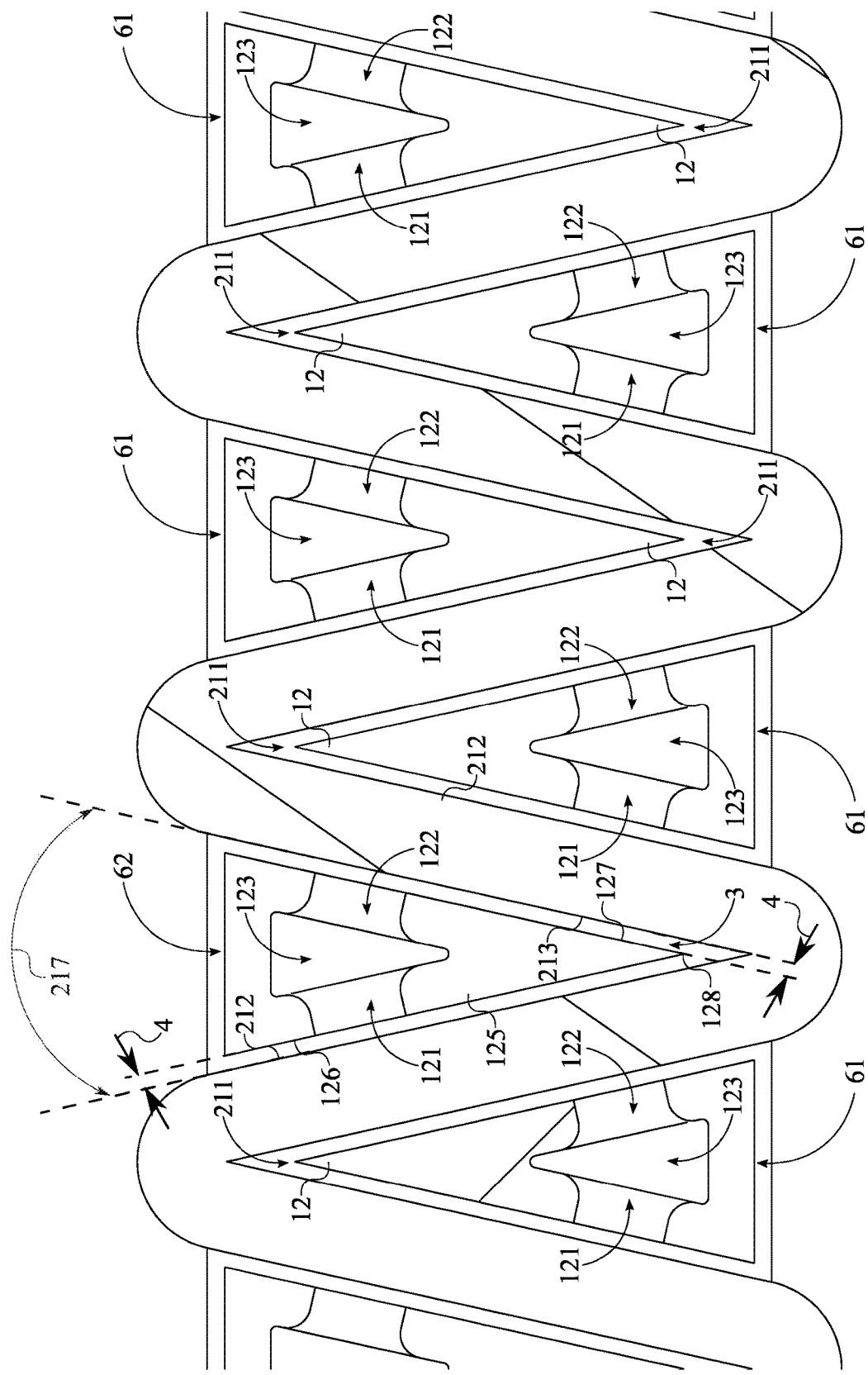
FIG. 4 is a bottom cross section view taken along line 4-4 in FIG. 2 illustrating the positioning of each of the plurality of wedge-inserts in the corresponding channel from the plurality of V-shaped channels.

The preferred embodiment of the present invention comprises a manifold 1 and a contactor 2. As can be seen in FIG. 1 and FIG. 2, the manifold 1 takes in the liquid amine and distributes it through the contactor 2. The manifold 1 is scalable and can be longer, shorter, or wider depending on the application and the process flow rate. Similarly, the contactor 2 can be placed in series or parallel to accommodate the geometry and function of the application. Preferably, the contactor 2 is made of a caustic resistant thermoplastic but can be made of any caustic resistant material. Accordingly, the manifold 1 comprises a plurality of wedge-inserts 12. As can be seen in FIG. 4, the plurality of wedge-inserts 12 control the flow rate of the liquid amine into the contactor 2. As such, the contactor 2 is where the liquid amine contacts the incoming process airflow, thereby absorbing the carbon dioxide directly from the air. Preferably, the manifold 1 is connected adjacent to the contactor 2. More specifically, the manifold 1 is mounted on top of the contactor 2. Thus, the pressure in the manifold 1 pushes the liquid into the contactor 2 and the capillary nature of the fluid assisted by gravity draws the liquid amine down the plenum body 21 and exit from the bottom reservoir 9.

Figure 3:
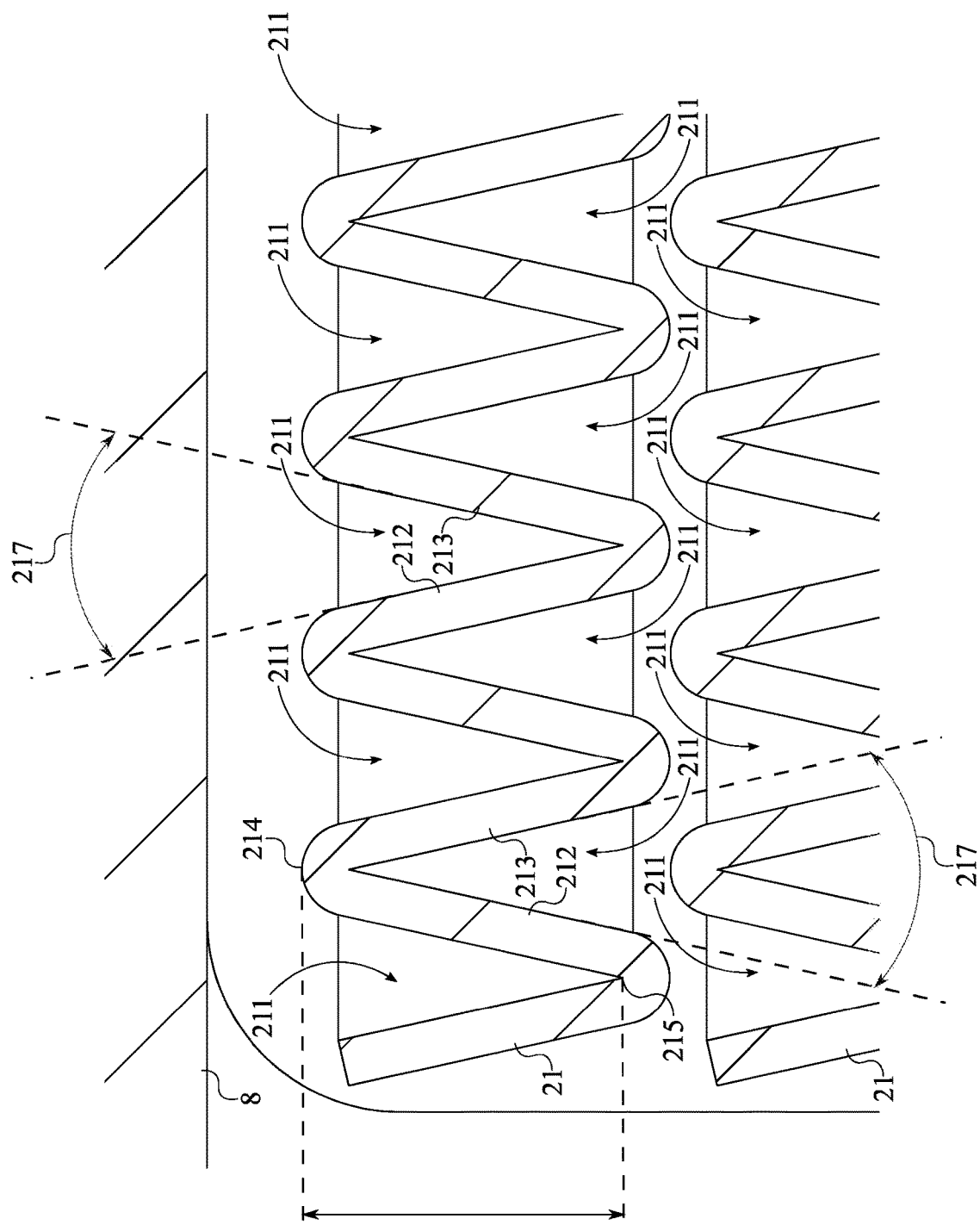
FIG. 3 is a bottom cross section view taken along line 3-3 in FIG. 2 illustrating the position of the plurality of plenum bodies within the contactor.

Referring to FIG. 3, in the preferred embodiment, the contactor 2 comprises a plurality of plenum bodies 21. The liquid amine is deposited into the plurality of plenum bodies 21, allowing for a film to form on the surface of each of the plurality of plenum bodies 21. Each of the plurality of plenum bodies 21 can be any height to fit the size of the contactor 2. This facilitates the chemical reaction of carbon dioxide into the liquid amine.

Preferably, each of the plurality of plenum bodies 21 comprises a plurality of V-shaped channels 211. The plurality of V-shaped channels 211 serves as a liquid collection point where the liquid amine is withdrawn, allowing the carbon dioxide to be separated. The plurality of V-shaped channels 211 is positioned adjacent to each other, along each of the plurality of plenum bodies 21. This gives the plenum body 13 a serpentine form which increases the reaction rates between the liquid amine and the carbon dioxide laden process air. Further, this forms a zig-zag pattern which increases the effective surface area of each of the plurality of plenum bodies 21 and maximizes the extraction of carbon dioxide. Further, the first inner wall 212 and the second inner wall 213 of each of the plurality of V-shaped channels 211 is positioned at an angle 217.

Figure 5:
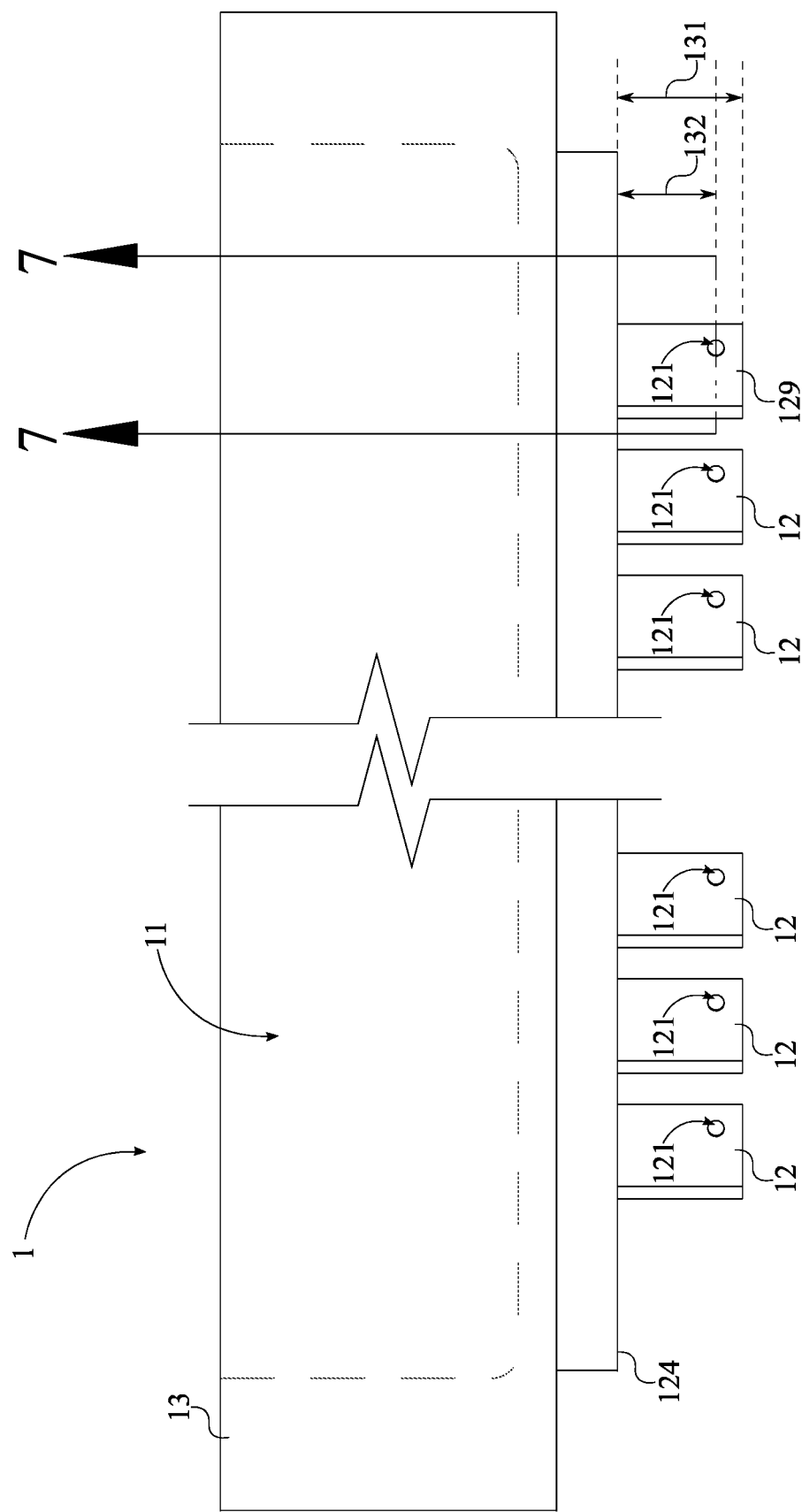
FIG. 5 is a side view of the manifold illustrating the positioning of the plurality of wedge-inserts along the manifold.
Figure 6:
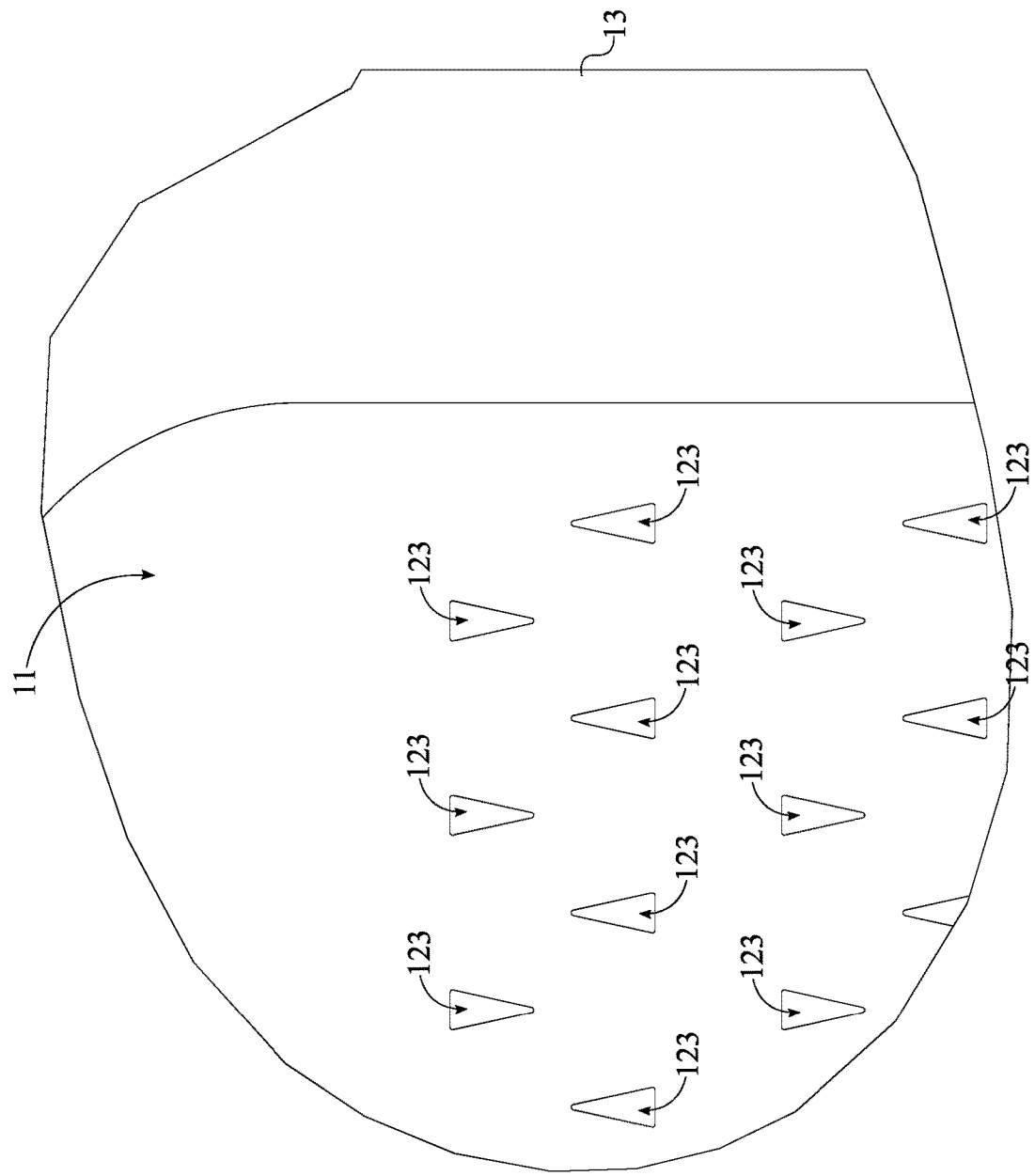
FIG. 6 is a bottom detail view of the manifold illustrating the inlet orifice for the plurality of wedge-inserts.

The angle 217 between the first inner wall 212 and the second inner wall 213 ranges from 24 degrees to 28 degrees. The angle 217 must be optimized to ensure the liquid amine collects between the first inner wall 212 and the second inner wall 213. In the preferred embodiment, the angle 217 is optimized at 26 degrees to promote an even distribution and the creates of a uniform film from the liquid amine that flows from the plurality of wedge-inserts 12 from the top of the contactor 2 to the bottom reservoir 9. However, the angle 217 may be 2 degrees more or less than the preferred 26 degrees and still function as intended. As seen in FIG. 5, the plurality of V-shaped channels 211 is oriented perpendicular to a bottom surface 124 of the manifold 1. As such, carbon dioxide laden air enters from the environment through one side of the contactor 2 at a 90-degree angle to the liquid amine flowing through the plurality of V-shaped channels 211. The flow velocity is predetermined and may change depending on the application of the contactor 2.

Figure 7:
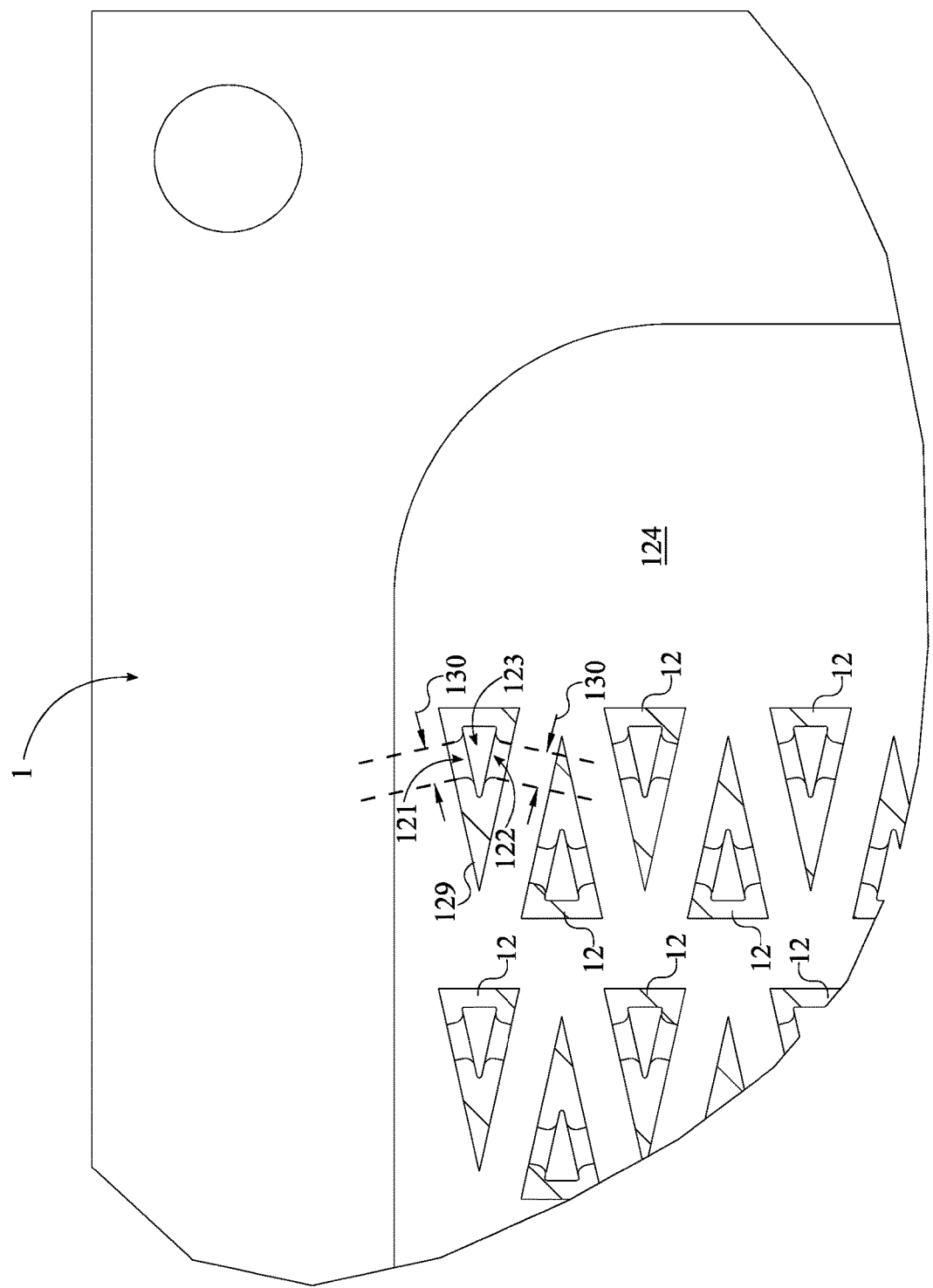
FIG. 7 is a top cross section view taken along line 7-7 in FIG. 5, illustrating the fluid connection between the inlet orifice, the first fluid orifice, and second fluid orifice.

Referring to FIG. 5 and FIG. 7, each of the plurality of wedge-inserts 12 comprises a first fluid orifice 121, a second fluid orifice 122, and an inlet orifice 123. The liquid amine preferably enters through the inlet orifice 123 and flows out of the first fluid orifice 121 and the second fluid orifice 122. As such, each of the plurality of wedge-inserts 12 is positioned within a corresponding channel 3 from the plurality of V-shaped channels 211. Thus, the inlet orifice 123 provides liquid division of the liquid amine in the manifold 1 and delivers an equal amount of fluid to the plurality of V-shaped channels 211. The first fluid orifice 121 and the second fluid orifice 122 is provided with backpressure to allow for a regulated flow from the manifold 1 to the plurality of V-shaped channels 211 and deposition of the liquid amine in a controlled even manner directly onto the plurality of plenum bodies 21. The flow rate of the liquid amine can be regulated by introducing additional fluid into the manifold 1, which has a direct relationship with the amount of liquid introduced into the plurality of plenum bodies 21 and changes the film thickness and removal rate of the liquid amine.

To achieve this, the manifold 1 comprises a fluid reservoir 11. The fluid reservoir 11 is a recess in the manifold 1 that holds the liquid amine as it slowly drains out of the plurality of wedge-inserts 12. In the preferred implementation, an air pump in fluid communication with the manifold 1 pressurizes the fluid reservoir 11. As such, the fluid reservoir 11 is kept at a positive pressure. The positive pressure is necessary to overcome the surface tension of the liquid amine as it exits the manifold 1 and to enable the liquid amine to move through the inlet orifice 123. This forces the liquid amine through the first fluid orifice 121 and the second fluid orifice 122, creating an even and smooth flow independent of gravity.

Referring to FIG. 4, the first inner wall 212 of each V-shaped channel is offset by an internal clearance 4 from a first outer wall 126 of each of the plurality of wedge-inserts 12. Similarly, the second inner wall 213 of each V-shaped channel is offset by the internal clearance 4 from a second outer wall 127 of each of the plurality of wedge-inserts 12. The internal clearance 4 is sized to provide a regulated flow of liquid amine into the first outer wall 126 and the second outer wall 127. Preferably, the internal clearance 4 ranges from 0.00475 inch to 0.00525 inch. Finally, a vertex 128 of the arbitrary wedge-insert 125 is aligned towards the first inner wall 212 and the second inner wall 213 of the V-shaped channel. This positions the first fluid orifice 121 and the second fluid orifice 122 pointing towards the first inner wall 212 and the second inner wall 213, respectively.

As can be seen in FIG. 5 and FIG. 7, in the preferred embodiment, the manifold 1 comprises a body 13. The fluid reservoir 11 traverses into the body 13. This creates a recess within the body 13 for storing the liquid amine. More specifically, the fluid reservoir 11 holds the liquid amine as it is slowly being drained by the plurality of wedge-inserts 12. Preferably, the plurality of wedge-inserts 12 is connected to the body 13, opposite of the fluid reservoir 11. As such, the inlet orifice 123 traverses through the body 13 from the fluid reservoir 11 into a corresponding wedge-insert 129 of the plurality of wedge-inserts 12. This allows the liquid amine to flow into the corresponding wedge-insert 129. Similarly, the first fluid orifice 121 and the second fluid orifice 122 traverse into the corresponding wedge-insert 129 of the plurality of wedge-inserts 12. Thus, the liquid amine can flow out of the first fluid orifice 121 and the second fluid orifice 122. Accordingly, the first fluid orifice 121 and the second fluid orifice 122 is in fluid communication with the fluid reservoir 11 through the inlet orifice 123. Further, the first fluid orifice 121 is oriented towards the first inner wall 212. Likewise, the second fluid orifice 122 is oriented towards the second inner wall 213. This aids in the formation of the film on the surface of the plurality of V-shaped channels 211.

An inlet spreader plate 5 evenly distributes the liquid amine onto the manifold 1, as can be seen in FIG. 1. As such, the inlet spreader plate 5 is connected adjacent to the manifold 1, opposite the contactor 2. The preferred inlet spreader plate 5 has an inlet and a plurality of outlets distributed along the length. The plurality of outlets ensure the liquid amine is uniformly distributed about the fluid reservoir 11.

In the preferred embodiment of the present invention, a length 131 of the plurality of wedge-inserts 12 ranges from 0.2375 inch to 0.2625 inch. The length 131 is optimized to accommodate insertion of each of the plurality of wedge-inserts 12 into the contactor 2, thereby allowing the delivery of liquid amine onto the surface of a corresponding V-shaped channel 216. Further, a diameter 130 of the first fluid orifice 121 and the second fluid orifice 122 ranges from 0.0286 inch to 0.0315 inch. The diameter 130 is configured to govern the fluid flow into the corresponding plenum body 21. For instance, increasing the diameter 130 allows for a different viscosity liquid to be used within the V-shaped channel. Accordingly, the diameter 130 of the first fluid orifice 121 and the second fluid orifice 122 must be tightly controlled.

Further, the first fluid orifice 121 and the second fluid orifice 122 is offset from the bottom surface 124 of the manifold 1 by an orifice offset distance 132. The orifice offset distance 132 ranges from 0.11875 inch to 0.13125 inch. This allows the present invention to operate as intended.

Figure 8:
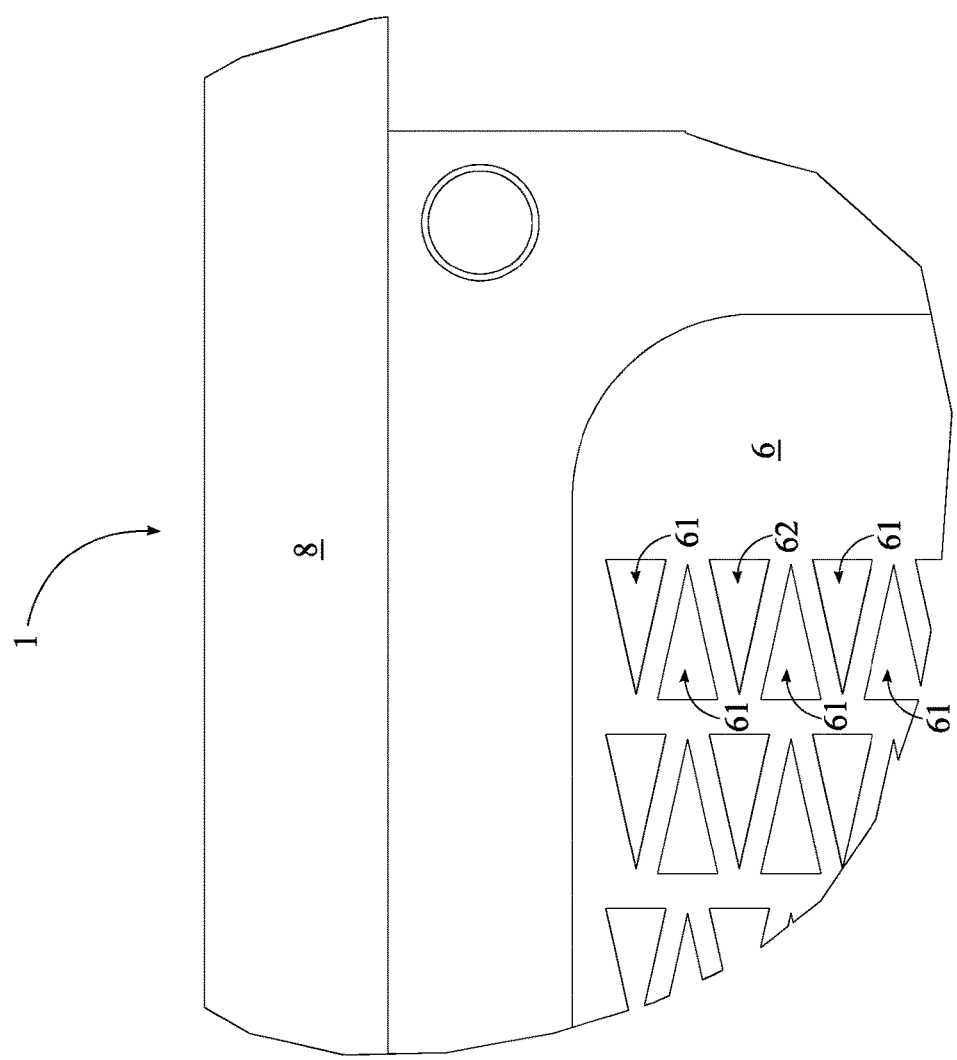
FIG. 8 is a bottom sectional view of the fluid distributor plate illustrating the positioning of the plurality of openings.

Referring to FIG. 4 and FIG. 8, a fluid distributor plate 6 allows the plurality of wedge-inserts 125 to traverse into the manifold 1 in the desired position. As such, the fluid distributor plate 6 comprises a plurality of openings 61. The plurality of openings 61 is a triangular opening creating a close fit with the similarly sized plurality of wedge-inserts 12. Accordingly, the fluid distributor plate 6 being mounted between the contactor 2 and the manifold 1. In the preferred embodiment, each of the plurality of plenum bodies 21 may be integrated over a corresponding opening 62 from the plurality of openings 61. This allows the plurality of wedge-inserts 12 to be positioned in the desired spot. As such, each of the plurality of wedge-inserts 12 traverses into the corresponding channel 3 from the plurality of V-shaped channels 211 through a corresponding opening 62 from the plurality of openings 61.

Referring back to FIG. 1 and FIG. 2, further, in another embodiment, a first flange 7 and a second flange 8 allow the contactor 2 to be mounted in a duct for an unencumbered air flow into the contactor 2. The first flange 7 is mounted adjacent to an inlet side of the contactor 2. Similarly, the second flange 8 is mounted adjacent to an outlet side of the contactor 2. The preferred embodiment of the first flange 7 and the second flange 8 are each sized 8 inches by 8 inches by 8 inches. At this size, the contact is capable of handling flow in excess of 12 liters per minute of liquid amine and 26 standard cubic feet per minute (SCFM) of process air flow.

As can be seen in FIG. 3, each of the plurality of V-shaped channels 211 is further comprises a trough 214 and a crest 215. The crest 215 corresponds to the concave side of the plurality of V-shaped channels 211 and the trough 214 corresponds to the convex side of the plurality of V-shaped channels 211 where the liquid amine accumulates. Preferably, the crest 215 is offset from the trough 214 by 0.25 inch. This causes the overall increase in the surface area of the film.

Referring once more to FIG. 1, the liquid amine falls into a bottom reservoir 9 after it exits the plurality of V-shaped channels 211 at a matching rate at which the liquid amine is entering the contactor 2. The flow of the liquid amine is controlled by using a single pump to add and remove the liquid amine into and from the manifold 1. As such, the bottom reservoir 9 is terminally mounted to the contactor 2, opposite the manifold 1. In the preferred embodiment, a plate with opening is mounted between the plurality of plenum bodies 21. Each of the plurality of V-shaped channels 211 feeds directly into the bottom reservoir 9, which allows for a flow-through directly into the bottom reservoir 9 to reduce turbulence in the liquid amine.

The bottom reservoir 9 has a liquid management system to effectively accommodate the removal efficiency of the liquid amine from the bottom reservoir 9 and prevent flooding. As such, the bottom reservoir 9 is kept at a negative pressure. Finally, an overflow opening 10 is provided to extract excess liquid amine that accumulates in the bottom reservoir 9. Preferably, the overflow opening 10 traverses into a sidewall 22 of the contactor 2. As such, the overflow opening 10 is positioned slightly above the bottom reservoir 9 so that excess liquid amine in the overflow reservoir can easily exit.

Although the invention has been explained in relation to its preferred embodiment, it is to be understood that many other possible modifications and variations can be made without departing from the spirit and scope of the invention as hereinafter claimed.

What is claimed is:

1. An air-liquid amine contactor for gaseous carbon dioxide extraction from a process air stream comprising:
   a manifold;
   a contactor;
   the manifold comprising a plurality of wedge-inserts;
   the contactor comprising a plurality of plenum bodies;
   each of the plurality of plenum bodies comprising a plurality of V-shaped channels;
   each of the plurality of wedge-inserts comprising a first fluid orifice, a second fluid orifice, and an inlet orifice;
   the plurality of V-shaped channels being positioned adjacent to each other, along each of the plurality of plenum bodies;
   a first inner wall and a second inner wall of each of plurality of V-shaped channels being positioned at an angle;
   the angle between the first inner wall and the second inner wall ranging from 24 degrees to 28 degrees;
   the manifold being connected adjacent to the contactor;
   the plurality of V-shaped channels being oriented perpendicular to a bottom surface of the manifold; and
   each of the plurality of wedge-inserts being positioned within a corresponding channel from the plurality of V-shaped channels.

2. The air-liquid amine contactor for gaseous carbon dioxide extraction from a process air stream as claimed in claim 1 comprising:
   the manifold comprising a fluid reservoir; and
   the fluid reservoir being kept at a positive pressure.

3. The air-liquid amine contactor for gaseous carbon dioxide extraction from a process air stream as claimed in claim 1 comprising:
   the first inner wall of each V-shaped channel being offset by an internal clearance from a first outer wall of each of the plurality of wedge-inserts;
   the second inner wall of each V-shaped channel being offset by the internal clearance from a second outer wall of each of the plurality of wedge-inserts;
   the internal clearance ranging from 0.00475 inch to 0.00525 inch; and
   a vertex of the arbitrary wedge-insert being aligned towards the first inner wall and a second inner wall of the V-shaped channel.

4. The air-liquid amine contactor for gaseous carbon dioxide extraction from a process air stream as claimed in claim 1 comprising:
   the manifold comprising a body and a fluid reservoir;
   the fluid reservoir traversing into the body;
   the plurality of wedge-inserts being connected to the body, opposite of the fluid reservoir;
   the inlet orifice traversing through the body from the fluid reservoir into a corresponding wedge-insert of the plurality of wedge-inserts;
   the first fluid orifice and the second fluid orifice traversing into the corresponding wedge-insert of the plurality of wedge-inserts;
   the first fluid orifice and the second fluid orifice being in fluid communication with the fluid reservoir through the inlet orifice;
   the first fluid orifice being oriented towards the first inner wall; and
   the second fluid orifice being oriented towards the second inner wall.

5. The air-liquid amine contactor for gaseous carbon dioxide extraction from a process air stream as claimed in claim 1 comprising:

an inlet spreader plate; and the inlet spreader plate being connected adjacent to the manifold, opposite the contactor.

6. The air-liquid amine contactor for gaseous carbon dioxide extraction from a process air stream as claimed in claim 1 comprising:

a length of each of the plurality of wedge-inserts ranging from 0.2375 inch to 0.2625 inch.

7. The air-liquid amine contactor for gaseous carbon dioxide extraction from a process air stream as claimed in claim 1 comprising:

a diameter of the first fluid orifice and the second fluid orifice ranging from 0.0286 inch to 0.0315 inch.

8. The air-liquid amine contactor for gaseous carbon dioxide extraction from a process air stream as claimed in claim 1 comprising:

the first fluid orifice and the second fluid orifice being offset from the bottom surface of the manifold by an orifice offset distance; and the orifice offset distance ranging from 0.11875 inch to 0.13125 inch.

9. The air-liquid amine contactor for gaseous carbon dioxide extraction from a process air stream as claimed in claim 1 comprising:

a fluid distributor plate;

the fluid distributor plate comprises a plurality of openings;

the fluid distributor plate being mounted between the contactor and the manifold; and each of the plurality of wedge-inserts traversing into the corresponding channel from the plurality of V-shaped channels through a corresponding opening from the plurality of openings.

10. The air-liquid amine contactor for gaseous carbon dioxide extraction from a process air stream as claimed in claim 1 comprising:

a first flange;

a second flange;

the first flange being mounted adjacent to an inlet side the contactor; and the second flange being mounted adjacent to an outlet side of the contactor.

11. The air-liquid amine contactor for gaseous carbon dioxide extraction from a process air stream as claimed in claim 1 comprising:

each of the plurality of V-shaped channels further comprises a trough and a crest; and the crest being offset from the trough by 0.25 inch.

12. The air-liquid amine contactor for gaseous carbon dioxide extraction from a process air stream as claimed in claim 1 comprising:

a bottom reservoir;

an overflow opening;

the bottom reservoir being terminally mounted to the contactor, opposite the manifold;

the bottom reservoir being kept at a negative pressure; and the overflow opening traversing into a sidewall of the contactor.

* * * * *